(12) United States Patent
Li

(10) Patent No.: US 10,664,077 B2
(45) Date of Patent: May 26, 2020

(54) AGNW TRANSPARENT CONDUCTIVE FILM AND MANUFACTURING METHOD THEREOF AND TOUCH PANEL

(71) Applicant: Wuhan China Star Optoelectronics Semiconductor Display Technology Co., Ltd., Wuhan, Hubei (CN)

(72) Inventor: Bo Li, Guangdong (CN)

(73) Assignee: WUHAN CHINA OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 141 days.

(21) Appl. No.: 15/925,001

(22) Filed: Mar. 19, 2018

(65) Prior Publication Data

US 2019/0171307 A1 Jun. 6, 2019

Related U.S. Application Data

(63) Continuation of application No. PCT/CN2018/071467, filed on Jan. 4, 2018.

(30) Foreign Application Priority Data

Dec. 6, 2017 (CN) .......................... 2017 1 1274958

(51) Int. Cl.
*G06F 3/041* (2006.01)
*H01B 1/22* (2006.01)
(Continued)

(52) U.S. Cl.
CPC ............ *G06F 3/041* (2013.01); *B32B 27/365* (2013.01); *H01B 1/22* (2013.01);
(Continued)

(58) Field of Classification Search
CPC ................ B32B 2457/208; H01B 1/22; G06F 2203/04112; G06F 3/041–3/047
See application file for complete search history.

(56) References Cited

U.S. PATENT DOCUMENTS

| 2013/0251983 A1* | 9/2013 | Kondo ..................... H01B 1/22 428/336 |
| 2017/0010741 A1 | 1/2017 | Chang et al. |

FOREIGN PATENT DOCUMENTS

| CN | 103617830 A | 3/2014 |
| CN | 104094362 A | 10/2014 |

(Continued)

*Primary Examiner* — Ramsey Zacharia
(74) *Attorney, Agent, or Firm* — Hemisphere Law, PLLC; Zhigang Ma

(57) ABSTRACT

An AgNW transparent conductive film and manufacturing method, and a touch panel thereof are provided. The AgNW transparent conductive film includes a transparent substrate, and a compound layer positioned on the transparent substrate. The compound layer comprises AgNWs and active materials, partial the active material exposed on surface of the compound layer which are far away the transparent substrate, end of molecular chain of the active material has terminal group could react with acidic group. This disclosure enhances tolerance of photoresist material and chemical liquid which are usually used for wet chemical etching process while produces touch panel. The manufacturing method comprises coating an active function layer doping with active materials on the transparent substrate, and then forming the AgNW on the active function layer, obtaining the compound layer.

8 Claims, 3 Drawing Sheets

(51) Int. Cl.
*B82Y 20/00* (2011.01)
*B32B 27/36* (2006.01)
*B32B 38/00* (2006.01)

(52) U.S. Cl.
CPC . *B32B 2038/0076* (2013.01); *B32B 2307/202* (2013.01); *B32B 2307/412* (2013.01); *B32B 2457/208* (2013.01); *B82Y 20/00* (2013.01); *G06F 2203/04103* (2013.01); *G06F 2203/04112* (2013.01)

(56) References Cited

FOREIGN PATENT DOCUMENTS

| | | |
|---|---|---|
| CN | 104204111 A | 12/2014 |
| CN | 104779014 A | 7/2015 |
| CN | 106843621 A | 6/2017 |
| CN | 107077906 A | 8/2017 |
| JP | 2015-149319 A | 8/2015 |

\* cited by examiner

AGNW TRANSPARENT CONDUCTIVE FILM AND MANUFACTURING METHOD THEREOF AND TOUCH PANEL

RELATED APPLICATIONS

This application is a continuation application of PCT Patent Application No. PCT/CN2018/071467, filed Jan. 4, 2018, which claims the priority benefit of Chinese Patent Application No. 201711274958.X, filed Dec. 6, 2017, which is herein incorporated by reference in its entirety.

FIELD OF THE DISCLOSURE

The disclosure relates to a conductive film field, and more particularly to an AgNW transparent conductive film and manufacturing method thereof and a touch panel.

BACKGROUND

Indium tin oxide (ITO) material as a traditional conductive material of touch panel technology, and play an important role for pushing development of touch panel technology. Although ITO has a better optoelectronic properties, other performance is worse such as flexibility, it is not good at for repeats bending, and not suitable to used for flexible touch display products.

In recent years, it already appears much kind of materials for replacing ITO, such as silver nanowire (AgNW), grapheme, and conductive high molecular (PEDOT, PSS) materials. Wherein, the AgNW has low impedance, relatively easy to prepare, enter to industry producing firstly, and partially replaces ITO material.

Currently, the method of manufacturing AgNW conductive film is major to use laser etching process. According to the touch panel sensing circuit usually has complex pattern, the pattern is blocking the region which is no needs to conducting by laser process totally, and it obviously has slow effectiveness. The touch display industry is usually using wet etching process, because of the photoresist is a high molecular polymer forming by small molecular monomer according polymerization, terminal group of the small molecular which is not totally polymerized and the terminal group of the high molecular which is already polymerized both have acidic group, it will interact with the AgNW and substrate material of the AgNW. Therefore, the material of the AgNW conductive film be modify, etching not enough and some abnormal problem after a serious of photolithography of exposing, development, etching, and removing coating. It caused worse stability of process.

SUMMARY

A technical problem to be solved by the disclosure is to provide an AgNW transparent conductive film and manufacturing method thereof and a touch panel. The AgNW transparent conductive film of this disclosure enhances tolerance of photoresist material and chemical liquid which are usually used for wet chemical etching process while produces touch panel.

Furthermore, the disclosure further provides a display device including the display panel.

An objective of the disclosure is achieved by following embodiments. In particular, an AgNW transparent conductive film, comprising a transparent substrate, and a compound layer positioned on the transparent substrate; the compound layer comprises AgNWs and active materials, partial the active material exposed on surface of the compound layer which are far away the transparent substrate, end of molecular chain of the active material has terminal group could react with acidic group.

In an embodiment, the AgNWs are laid on surface of the transparent substrate, the active materials are distributed in a space between the AgNWs and/or encapsulated on surface of the AgNWs.

In an embodiment, the compound layer comprises an active function layer positioned on the transparent substrate, the active materials are doping in the active function layer, the AgNWs are positioned on the active function layer, partial the active materials passing through a space between the AgNWs and exposed on surface of the compound layer which is far away the transparent substrate.

In an embodiment, the active materials comprise at least one of ammonium anionic surfactant material and ionic surfactant material.

In an embodiment, the active function layer is a transparent polymer film which doping with the active materials, and/or thickness of the active function layer is 0.8-2 μm.

In an embodiment, a transparent substrate layer is positioned between the compound layer and the transparent substrate, the transparent substrate layer includes organic transparent material.

The AgNW transparent conductive film of the embodiment in this disclosure positioning active materials, end of molecular chain of the active materials has terminal group could react with acidic group. It could preferably combine with acidic group which reside from the photoresist material, enhance tolerance of photoresist material and chemical liquid which are usually used for wet chemical etching process while produces touch panel. It is easy to mass produce and stably produce patterning conductive circuit by silver transparent conductive film.

According to another aspect of the disclosure, the disclosure further provides a method of manufacturing AgNW transparent conductive film, comprising
  providing a transparent substrate;
  coating an active function layer doping with active materials on the transparent substrate, end of molecular chain of the active materials have terminal group could react with acidic group; and then forming the AgNW on the active function layer, obtaining the compound layer.

In an embodiment, in the step of coating an active function layer doping with active material on the transparent substrate which comprising
  providing an active coating liquid, the active coating liquid contains active materials and monomer, and coating the active coating liquid on surface of the transparent substrate, curing and forming the active function layer.

According to yet another aspect of the disclosure, the disclosure further provides a method of manufacturing AgNW transparent conductive film, comprising
  providing a transparent substrate;
  providing the AgNW coating liquid doping with active material, end of molecular chain of the active materials have terminal group could react with acidic group; coating the AgNW coating liquid doping with active material on the transparent substrate, obtaining the compound layer.

The method of manufacturing AgNW transparent conductive film according to embodiment in this disclosure, it is easy to operate and could achieve mass produce of AgNW transparent conductive film.

According to further another aspect of the disclosure, the disclosure further provides a touch panel, comprising a conducting circuit on invisible region, the conducting circuit is obtained by laser etching process or photolithography for patterning an AgNW transparent conductive film as described above.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

The disclosure will be further described in detail with reference to accompanying drawings and preferred embodiments as follows.

Figure 1:
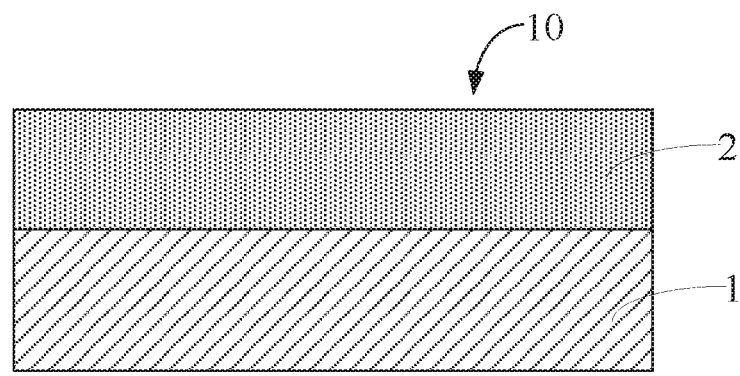
FIG. 1 is a cross sectional structural schematic view of an AgNW transparent conductive film according to an embodiment of the disclosure.

Please refer to FIG. 1, the AgNW transparent conductive film 10 of the embodiment in this disclosure, comprising a transparent substrate 1, and a compound layer 2 is positioned on the transparent substrate 1. The compound layer 2 comprises AgNWs and active materials, partial active materials exposed on surface of the compound layer which are far away the transparent substrate 1, end of molecular chain of the active materials have terminal group could react with acidic group.

Figure 2:
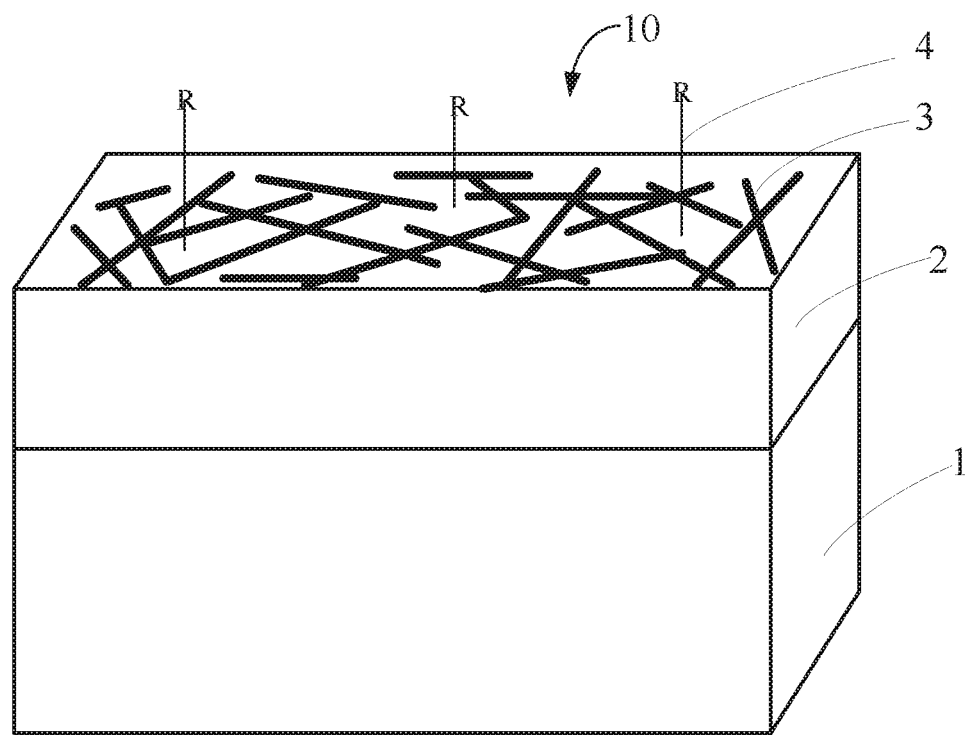
FIG. 2 is a structural schematic view of an AgNW transparent conductive film according to an embodiment of the disclosure.

Please refer to FIG. 2. FIG. 2 is a structural schematic view of an AgNW transparent conductive film 10. The compound layer 2 comprises AgNWs 3 and active materials 4, because the AgNWs 3 are random arrangement and forming porous 2D and/3D mesh structure with the active material 4. The partial active materials 4 exposed on surface of the compound layer which is far away the transparent substrate 1, and the remaining part of the active materials are covered by AgNWs and without exposing (not shown). The terminal group of the active material 4 is R, R could be terminal group could react with acidic group such as amino group (—$NH_2$). In this embodiment, the compound layer 2 has active materials and the active materials are exposed on the surface of the compound layer. While positioning the photoresist material on the compound material, the residual acid group from photoresist material will fever to combine with terminal group of the active materials, it could effectively prevent the residual acid group from the photoresist material damages the AgNW and substrate material. At the same time, the photoresist material is combining with the active material in the compound layer, enhances adhering force of the photoresist material on the compound layer, and enhances protecting property of photoresist material for AgNW. And then it's easy to remove the combination between the photoresist material and the active material by base aqueous solution. The active material of the compound layer is better to the following process for example enhances adhering force between touch panel sensor and silver paste and OCA and other materials.

In this embodiment, the transparent substrate 1 includes polyethylene terephthalate (PET), polyethylene terephthalate (PEN) or polycarbonate (PC). Selectively, thickness of the transparent substrate 1 is not be limited, it could be adjusted by reality.

Figure 3:
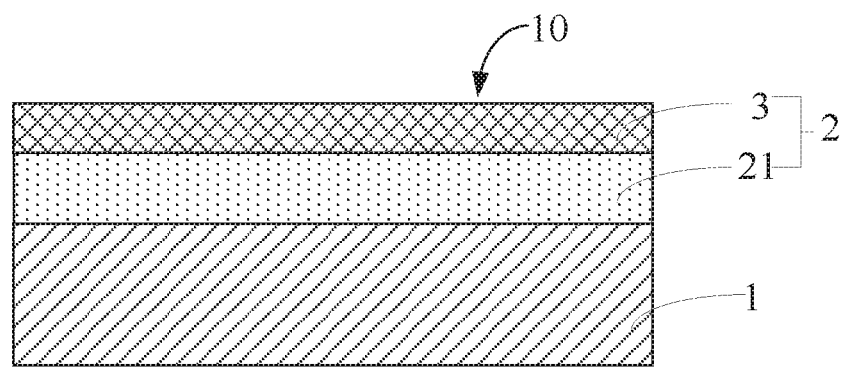
FIG. 3 is a cross sectional structural schematic view of an AgNW transparent conductive film according to another embodiment of the disclosure.

Please refer to FIG. 3, in this embodiment, the compound layer 2 includes an active function layer 21 is positioned on the transparent substrate 1, the active material doping within the active function layer 21, the AgNWs 3 are positioned on the active function layer 21, partial the active materials passing through a space between the AgNWs 3 and exposed on surface of the compound layer 2 which is far away the transparent substrate 1. It could be understand, because property of the AgNWs, they are random covering on the active function layer, and forming porous 2D and/3D mesh structure with the active materials. While the AgNW is positioned on the active function layer, partial of active materials will passing through the space between the AgNWs and exposed on surface of the compound layer which is far away the transparent substrate, and the photoresist material will prefer to react with this partial active materials in the following process. Selectively, partial of the active materials are higher than height of Ag NW. Further, the partial of the active materials exceed 20% of higher than height of AgNW. Selectively, the active function layer transparent polymer film which is doping with active materials. Selectively, thickness of the active function layer is 0.8-2 μm, the thickness of here indicated the average thickness of the active function layer.

In this embodiment, the AgNWs are laid on surface of the transparent substrate, the active materials are distributed in a space between the AgNWs and/or encapsulated on surface of the AgNWs. Selectively, partial of the active materials are higher than height of AgNWs. Further, the partial of the active materials exceed 20% of higher than height of AgNW. Selectively, in the compound layer, the weight ratio of the AgNWs and the active materials is more than 3:2.

In this embodiment, molecular chain terminal group of the active materials have basic group could react with acidic group such as amino group (—$NH_2$). Selectively, molecular chain terminal group of the active material has organic which containing basic group could react with acidic group. Selectively, the active materials comprise at least one of ammonium anionic surfactant material and ionic surfactant material. Specifically, the active materials include alkylene polyethers (PO-EP copolymer), polyoxyethylene lauryl ether or organic amine.

In this embodiment, thickness of AgNW which laid on surface of the transparent substrate is 10 nm-50 nm. Here is not limit the diameter and length of the AgNW. For example length of AgNW is 20-200 µm, diameter of AgNW is 10-200 nm.

Figure 4:
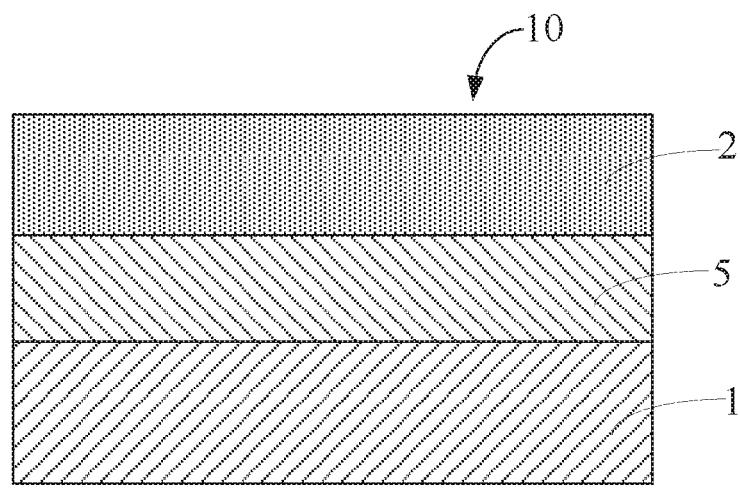
FIG. 4 is a structural schematic view of an AgNW transparent conductive film according to another embodiment of the disclosure.

Please refer to FIG. 4, in an embodiment; a transparent substrate layer 5 is positioned between the compound layer 2 and the transparent substrate 1. Selectively, the transparent substrate layer 5 includes organic transparent material. Specifically, materials of the transparent substrate layer 5 include polyurethane, organic silica, polyester or other transparent materials. Selectively, here is not limit the thickness of the transparent substrate layer 5, for example 100 nm-50 µm.

In another embodiment, while the compound layer includes active function layer, it without positioning the transparent substrate layer, the active function layer could be substrate of the AgNW. The embodiment is for enhancing tolerance of photoresist material and chemical liquid which are usually used for wet chemical etching process while produces touch panel. The active function layer as a substrate material that enhancing adhering force between the AgNW conductive layer and the transparent film substrate. Further, decreasing the stacking structure of the transparent substrate, and obtaining the AgNW conducting transparent film has simple structure.

The AgNW conductive layer of this embodiment, enhancing tolerance of photoresist material and chemical liquid which are usually used for wet chemical etching process while produces touch panel. It is easy to mass produce and stably produce patterning conductive circuit by silver wire transparent conductive film.

Figure 5:
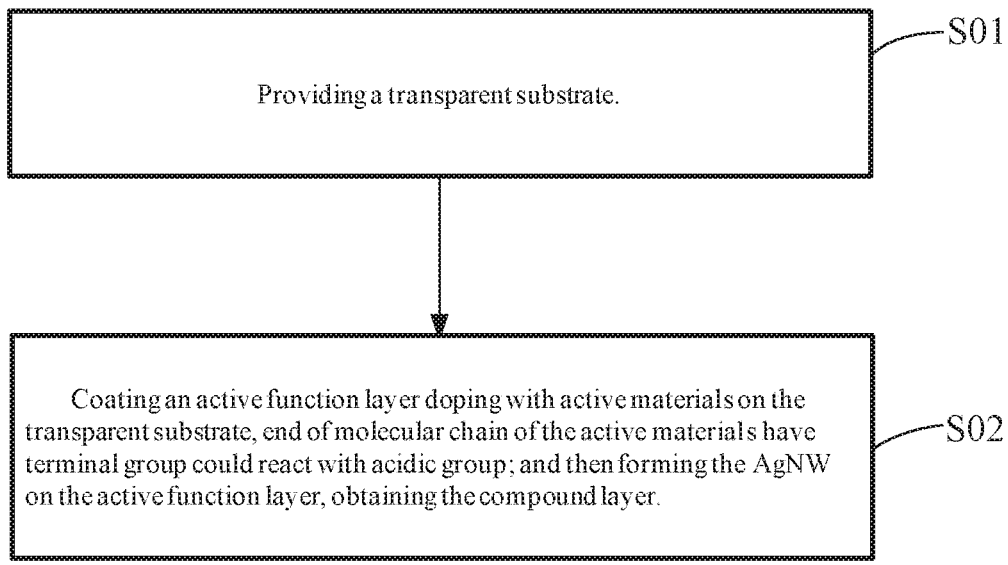
FIG. 5 is a flow chart diagram of method of manufacturing the AgNW transparent conductive film according to an embodiment of the disclosure.

Please refer to FIG. 5. FIG. 5 is a flow chart diagram of a method of manufacturing the AgNW transparent conductive film according to an embodiment of the disclosure, comprising following steps.

S01, providing a transparent substrate;

S02, coating an active function layer doping with active material on the transparent substrate, end of molecular chain of the active material has terminal group could reactive with acidic group; and then forming the AgNW on the active function layer, obtaining the compound layer.

In this embodiment, in the step S02, in the step of coating an active functional layer doping with active material on the transparent substrate which comprising providing an active coating liquid, the active coating liquid contains active materials and monomer, and coating the active coating liquid on surface of the transparent substrate, curing and forming the active function layer.

Selectively, in the step S02, coating the active coating liquid on the transparent substrate by roll-to-roll slot coating process.

Selectively, the monomer is grouping to polymer by photo-curing or heat-curing. The monomer is selectively not reacting with the AgNW, it could selected by reality for example, polyester monomer, polyurethanes monomer or polyvinyl alcohol monomer.

Selectively, in the active coating liquid, the mass ratio of the active material and the monomer is under 0.1-0.5:1, both the specific which in the active coating liquid accounts for 40%-80%.

Selectively, the active coating liquid includes organic solvent.

Selectively, in the step S02, forming the AgNW on the active function layer comprises following steps.

using the roller mold pressing or roll-to-roll slot coating process, and then heat-curing to form the AgNW on the active function layer.

In this embodiment, between the step S01 and the step S02, further comprising following steps.

coating the substrate material on the transparent substrate by roll-to-roll substrate, the substrate material could be polyurethane, organic silica, polyester or other transparent materials, and curing to from the transparent substrate layer.

In this embodiment, preparing the active function layer which is doping within the active material first, and then forming the AgNW on the active function layer. Because property of AgNW, partial of active materials of the active function layer passing through the space between the AgNWs and exposed the surface of the compound layer which is far away the transparent substrate.

Figure 6:
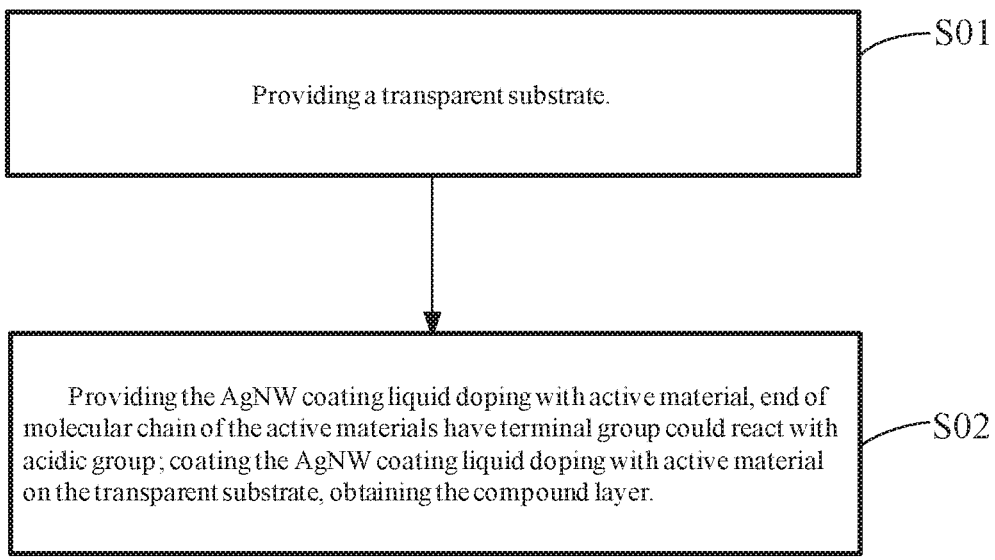
FIG. 6 is a flow chart diagram of method of manufacturing the AgNW transparent conductive film according to another embodiment of the disclosure.

Please refer to FIG. 6. FIG. 6 is a flow chart diagram of a method of manufacturing the AgNW transparent conductive film according to another embodiment of the disclosure. The method comprising following steps.

S10, providing a transparent substrate;

S20, providing the AgNW coating liquid doping with active material, end of molecular chain of the active materials have terminal group could react with acidic group; coating the AgNW coating liquid doping with active material on the transparent substrate, obtaining the compound layer.

In this embodiment, in step S20, in the AgNW coating liquid doping with active materials, the mass ration of the AgNW and the active materials is more that 1.5:1, and ration of the mass of AgNW and the active materials occupy to the mass of the AgNW coating liquid is smaller than 10%. Selectively, the coating liquid also contains the monomer which the specific is more than 10%, the monomer cross linking and curing after heating or UV light, such that fixing the AgNWs on the substrate, ensuring better adhering effect. Selectively, using the roller mold pressing or roll-to-roll slot coating process, and then heat-curing to form the compound layer on the transparent substrate.

In this embodiment, between the step S10 and the step S20, further comprising following steps.

coating the substrate material on the transparent substrate by roll-to-roll substrate, the substrate material could be polyurethane, organic silica, polyester or other transparent materials, and curing to from the transparent substrate layer.

In this embodiment, directly coating the AgNW coating liquid doping with active materials on the transparent substrate, and then curing, the active materials will distributed on the space between the AgNWs and/or encapsulating on surface of the AgNWs. Selectively, partially active materials exceed the height of the AgNW.

The method of manufacturing AgNW transparent conductive film of the embodiment in this disclosure is easy to operate, it could achieve to mass produce the AgNW transparent conductive film.

The disclosure further provides a touch panel, comprising a conducting circuit on invisible region, the conducting circuit is obtained by laser etching process or photolithography for patterning an AgNW transparent conductive film as described above.

In this embodiment, the operating process of photolithography includes.

providing an AgNW transparent conductive film, includes the transparent substrate and the compound layer positioned on the transparent substrate. The compound layer includes AgNWs and active materials, partial of active materials exposed on surface of the compound layer which is far away the transparent substrate, end of molecular chain of the active material has terminal group could react with acidic group.

coating the photoresist material on the compound layer, and then patterning the compound layer by photolithography.

Selectively, the photolithography process includes.

sequentially processing the photoresist materials by exposing, developing, wet etching and coating removal.

Selectively, the relatively parameter of process for exposing, developing, wet etching and coating removing could be selected by reality. Wherein, the coating removal process is by alkaline heating the coating removal liquid and washing the photoresist material, the active materials group combine with the photoresist will fast hydrolysis such that removing the coating.

In this embodiment, it also could directly process touch pattern on the AgNW conductive film by laser etching process.

Because of the photoresist material is made by highly molecular polymer forming by smaller molecular monomer by polymerization, the terminal group of the small molecular which is not fully polymerized or the high molecular which already finished the polymerization of the photoresist both have acid group such as carboxyl, for example the chemical formula of the photoresist material is

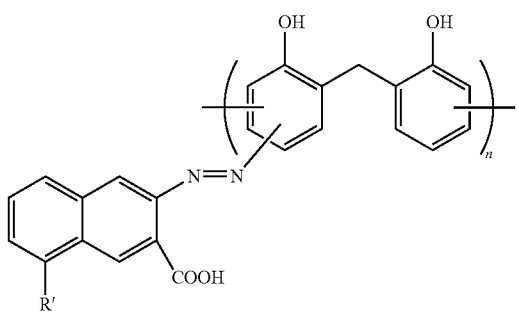

It is positioning the active materials of the compound layer of this disclosure, under the acidic liquid environment; the active materials will combine with acidic group which residue by photoresist material. It could enhance protecting property of photoresist material and also effectively prevent damage to the AgNW and the substrate material by the acidic group which residue by photoresist material. After development etching, washing by alkaline heating coating removal liquid, the active material group combine with the photoresist will fast hydrolysis such that removing the coating. Hence, this disclosure solve the problem of material modification, wore stable of produce while using the chemical wetting etching process to the nano-silver materials for manufacturing the touch panel. The touch panel of this disclosure could mass produce by chemical wetting etching process.

The foregoing contents are detailed description of the disclosure in conjunction with specific preferred embodiments and concrete embodiments of the disclosure are not limited to this description. For the person skilled in the art of the disclosure, without departing from the concept of the disclosure, simple deductions or substitutions can be made and should be included in the protection scope of the application.

What is claimed is:
1. An AgNW transparent conductive film, comprising
   a transparent substrate, and
   a compound layer positioned on the transparent substrate;
   wherein the compound layer comprises AgNWs and an active function layer doped with active materials, the active function layer is positioned on the transparent substrate, and the AgNWs are positioned on the active function layer;
   wherein some of the active materials are distributed in a space between the AgNWs, protruding from the space and being exposed on surface of the compound layer opposite the transparent substrate, the exposed active materials have terminal groups that can react with acidic group;
   wherein the exposed active materials are 20% higher than the AgNWs in a vertical direction, the weight ratio of the AgNWs and the active materials is greater than 3:2.
2. The AgNW transparent conductive film according to claim 1, wherein the active materials comprise at least one of ammonium anionic surfactant material and ionic surfactant material.
3. The AgNW transparent conductive film according to claim 1, wherein the active function layer is a transparent polymer film doped with the active materials, and a thickness of the active function layer is 0.8-2 μm.
4. The AgNW transparent conductive film according to claim 1, wherein a transparent substrate layer is positioned between the compound layer and the transparent substrate, the transparent substrate layer includes organic transparent material.
5. A touch panel, comprising a conducting circuit on invisible region, the conducting circuit is obtained by laser etching process or photolithography for patterning an AgNW transparent conductive film, the AgNW transparent conductive film comprises
   a transparent substrate, and
   a compound layer positioned on the transparent substrate;
   wherein the compound layer comprises AgNWs and an active function layer doped with active materials, the active function layer is positioned on the transparent substrate, and the AgNWs are positioned on the active function layer;
   wherein some of the active materials are distributed in a space between the AgNWs, protruding from the space and being exposed on surface of the compound layer opposite the transparent substrate, the exposed active materials have terminal groups that can react with acidic group;
   wherein the exposed active materials are 20% higher than the AgNWs in a vertical direction, the weight ratio of the AgNWs and the active materials is greater than 3:2.
6. The touch panel according to claim 5, wherein the active materials comprise at least one of ammonium anionic surfactant material and ionic surfactant material.
7. The touch panel according to claim 5, wherein the active function layer is a transparent polymer film doped with the active materials, and a thickness of the active function layer is 0.8-2 μm.
8. The touch panel according to claim 5, wherein a transparent substrate layer is positioned between the compound layer and the transparent substrate, the transparent substrate layer includes organic transparent material.

* * * * *

UNITED STATES PATENT AND TRADEMARK OFFICE
CERTIFICATE OF CORRECTION

PATENT NO. : 10,664,077 B2  
APPLICATION NO. : 15/925001  
DATED : May 26, 2020  
INVENTOR(S) : Bo Li

Page 1 of 1

It is certified that error appears in the above-identified patent and that said Letters Patent is hereby corrected as shown below:

On the Title Page

Item (73), Replace the assignee data with the following:
-- (73) Assignee: WUHAN CHINA STAR
OPTOELECTRONICS
SEMICONDUCTOR DISPLAY
TECHNOLOGY CO., LTD., Wuhan
(CN) --

Signed and Sealed this  
Twenty-second Day of September, 2020

Andrei Iancu  
*Director of the United States Patent and Trademark Office*